(12) United States Patent
Gomes

(10) Patent No.: US 10,754,763 B2
(45) Date of Patent: Aug. 25, 2020

(54) BYPASSING USER-SELECTED FUNCTIONS DURING TEST CASE GENERATION

(71) Applicant: INTERNATIONAL BUSINESS MACHINES CORPORATION, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 16/030,522

(22) Filed: Jul. 9, 2018

(65) Prior Publication Data

US 2020/0012588 A1 Jan. 9, 2020

(51) Int. Cl.
*G06F 11/00* (2006.01)
*G06F 11/36* (2006.01)

(52) U.S. Cl.
CPC ...... *G06F 11/3684* (2013.01); *G06F 11/3664* (2013.01); *G06F 11/3676* (2013.01)

(58) Field of Classification Search
CPC ............ G06F 11/0706; G06F 11/3612; G06F 11/3636; G06F 11/366; G06F 11/3668; G06F 11/3672; G06F 11/00; G06F 11/0718; G06F 11/3688
USPC ........................................................ 714/38.1
See application file for complete search history.

(56) References Cited

U.S. PATENT DOCUMENTS

| | | | |
|---|---|---|---|
| 8,468,244 B2 | 6/2013 | Redlich et al. | |
| 9,208,335 B2 | 12/2015 | Wu et al. | |
| 9,420,068 B1 | 8/2016 | Johnson et al. | |
| 10,318,250 B1* | 6/2019 | Ferrie | G06F 11/3612 |
| 2005/0228980 A1* | 10/2005 | Brokish | G06F 21/575 |
| | | | 713/2 |
| 2007/0011242 A1* | 1/2007 | McFarland | G06F 8/20 |
| | | | 709/205 |

(Continued)

OTHER PUBLICATIONS

Anonymously Disclosed "Method and apparatus for cryptographic instructions" IP.com No. IPCOM000214883D; Publication Date: Feb. 8, 2012; 6 pgs.

(Continued)

*Primary Examiner* — Sarai E Butler
(74) *Attorney, Agent, or Firm* — Cantor Colburn LLP; Teddi Maranzano

(57) ABSTRACT

Systems, methods, and computer-readable media are disclosed for generating a test case based on valid function codes that have not been selected for test case generation bypassing. A test program is provided that allows a user to specify, for each instruction, one or more function codes that the user does not want to use to generate a test case (e.g., that should be bypassed). A test stream generator is provided that has knowledge of valid and invalid function codes for any given supported instruction. A test case generator is provided that compares the function codes selected for bypassing to the valid function codes to identify a valid non-bypassed function code, which is used to generate a test case. Systems, methods, and computer-readable media are also disclosed for generating an exception test case using only one or more invalid function codes that have not been selected for bypassing.

20 Claims, 5 Drawing Sheets

(56) References Cited

U.S. PATENT DOCUMENTS

| | | | |
|---|---|---|---|
| 2010/0306601 A1* | 12/2010 | Kranz | G05B 19/0428 714/55 |
| 2012/0222014 A1* | 8/2012 | Peretz | G06F 11/3684 717/125 |
| 2014/0082419 A1 | 3/2014 | Untinen et al. | |
| 2014/0281737 A1* | 9/2014 | Compann | H04L 41/32 714/46 |
| 2016/0154725 A1* | 6/2016 | Lopian | G06F 11/3624 717/131 |
| 2016/0321048 A1* | 11/2016 | Matsuura | G06F 8/4442 |
| 2019/0128963 A1* | 5/2019 | Wu | G01R 31/31855 |
| 2019/0238865 A1* | 8/2019 | Han | H04N 19/124 |

OTHER PUBLICATIONS

Anonymously Disclosed "Method for encryption to detect bit-wise errors and validate payload corruption during Network processor validation", IP.com No. IPCOM000146681D; Publication Date: Feb. 19, 2007; 9 pgs.

Anonymously Disclosed "Method for verifying intermediate results of a randomly generated testcase of Processor Functional Validation Exerciser", IP.com No. IPCOM000243758D; IP.com Publication Date; Oct. 16, 2015; 10 pgs.

IBM et al. "High Secure and High Performance Encryption Method Using High Security Module and CPU Encryption Function", IP.com No. IPCOM000144433D; Publication Date: Dec. 26, 2006; 3 pgs.

Li, Xin et al. "CipherXRay: Exposing Cryptographic Operations and Transient Secrets from Monitored Binary Execution", IEEE Transactions on Dependable and Secure Computing•, vol. 11, Issue No. 2, Mar. 2014, 14 pgs.

* cited by examiner

BYPASSING USER-SELECTED FUNCTIONS DURING TEST CASE GENERATION

BACKGROUND

The present invention relates generally to software testing, and more specifically, to test case generation.

Software testing involves the execution of a software component or a system component to evaluate one or more properties of interest. In general, these properties indicate the extent to which the component or system under test meets the requirements that guided its design and development; responds correctly to all kinds of inputs; performs its functions within an acceptable timeframe; is sufficiently usable; can be installed and run in its intended environments; and achieves the general result its stakeholders desire.

All software testing uses some type of strategy to select tests that are feasible for the available time and resources. As a result, software testing typically (but not exclusively) attempts to execute a program or application with the intent of finding software bugs (errors or other defects). The job of testing is an iterative process in that when one bug is detected and corrected, other, deeper already present bugs can be illuminated or new ones can be created. Software testing can provide objective, independent information about the quality of software and risk of its failure.

SUMMARY

In one or more example embodiments, a method for generating a test case is disclosed. The method includes identifying a bypass function code mask indicating a group of one or more function codes selected by a user for bypassing in connection with generating the test case and comparing the bypass function code mask to a valid function code array indicating a group of valid function codes available for use for an instruction. The method further includes identifying, based at least in part on the comparing, a function code in the group of valid function codes that is not indicated as being selected for bypassing in the bypass function code mask and generating the test case at least in part by using a function corresponding to the function code.

In one or more other example embodiments, a system for generating a test case is disclosed. The system includes at least one memory storing computer-executable instructions and at least one processor configured to access the at least one memory and execute the computer-executable instructions to perform a set of operations. The operations include identifying a bypass function code mask indicating a group of one or more function codes selected by a user for bypassing in connection with generating the test case and comparing the bypass function code mask to a valid function code array indicating a group of valid function codes available for use for an instruction. The operations further include identifying, based at least in part on the comparing, a function code in the group of valid function codes that is not indicated as being selected for bypassing in the bypass function code mask and generating the test case at least in part by using a function corresponding to the function code.

In one or more other example embodiments, a computer program product for generating a test case is disclosed. The computer program product includes a non-transitory storage medium readable by a processing circuit, the storage medium storing instructions executable by the processing circuit to cause a method to be performed. The method includes identifying a bypass function code mask indicating a group of one or more function codes selected by a user for bypassing in connection with generating the test case and comparing the bypass function code mask to a valid function code array indicating a group of valid function codes available for use for an instruction. The method further includes identifying, based at least in part on the comparing, a function code in the group of valid function codes that is not indicated as being selected for bypassing in the bypass function code mask and generating the test case at least in part by using a function corresponding to the function code.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
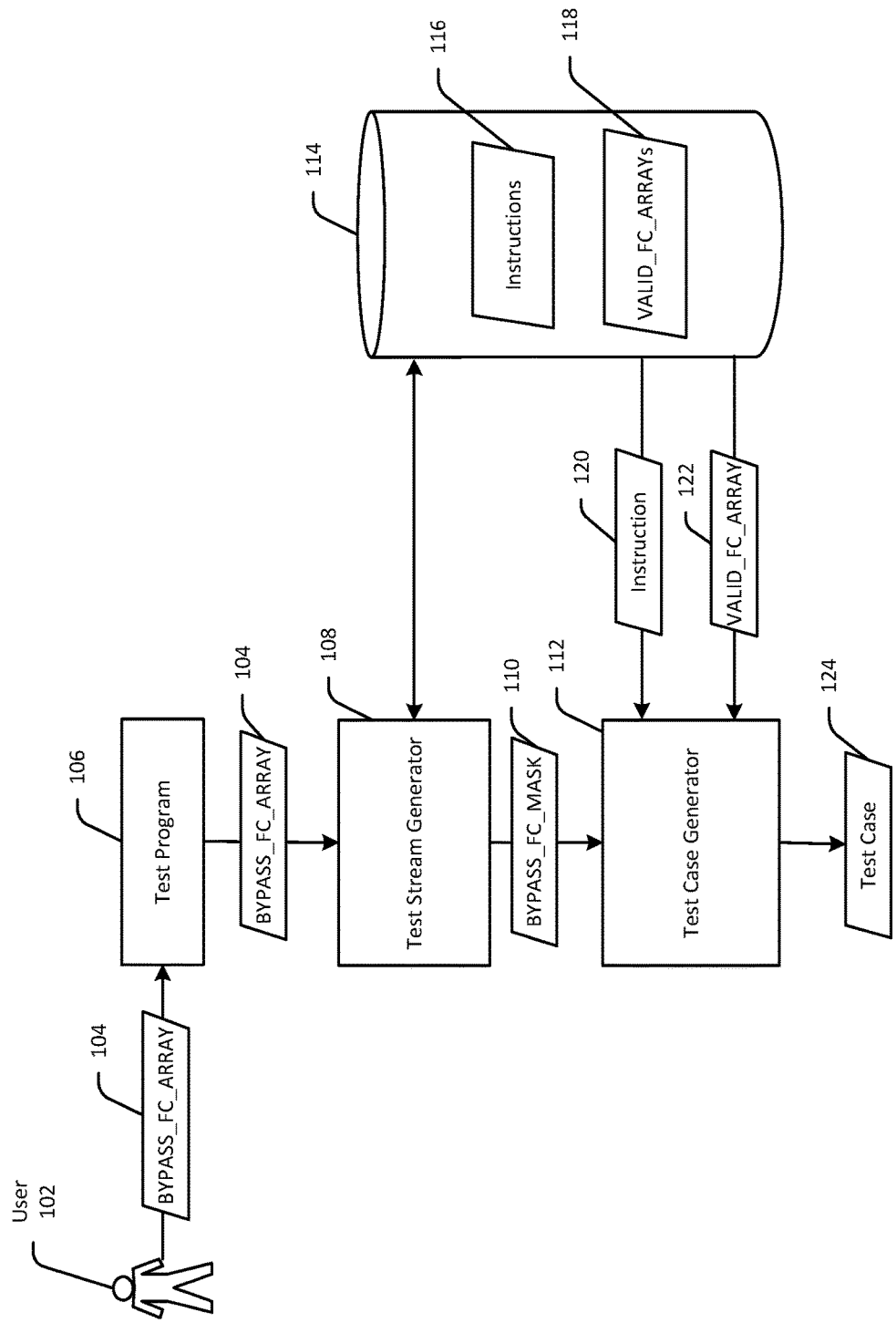
FIG. 1 is a schematic hybrid data flow/block diagram illustrating test case generation using a valid and non-bypassed function in accordance with example embodiments.

Example embodiments relate to, among other things, systems, methods, computer-readable media, techniques, and methodologies for generating a test case based on valid function codes that have not been selected for test case generation bypassing by a user. In accordance with example embodiments, a test program is provided that allows a user to specify, for each instruction, one or more functions that the user does not want to use to generate a test case, that is, function(s) that the user indicates should be bypassed when generating a test case. The user can specify which functions are to be bypassed for an instruction in a variety of suitable ways. For instance, in example embodiments, a user may provide, as input to the test program, a data structure that includes function code(s) corresponding to functions that the user wishes to bypass for a given instruction.

In accordance with example embodiments, a test stream generator is provided that has knowledge of which instructions are valid (i.e., supported) and which instructions are invalid (i.e., not supported) for any given machine configuration. In addition, in accordance with example embodiments, the test stream generator is also aware of which functions are valid and which functions are invalid for any given supported instruction that can be used to generate a test case. In connection with generating a test case for a given instruction according to an example embodiment, the test stream generator receives, from the test program, the data structure containing the function code(s) to be bypassed, and optionally, performs a format conversion on the data structure to facilitate subsequent comparison to a data structure containing an indication of the valid function codes for the instruction.

In accordance with example embodiments, a test case generator is provided that performs the above-referenced comparison. In particular, the test case generator selects an index of the valid function codes data structure and begins scanning the data structure to check, for each valid function code, whether the function code has been selected for bypassing in the optionally format-converted data structure that indicates which function codes are to be bypassed. In accordance with example embodiments, if the test case generator identifies a valid function code that has not been selected for bypassing, then a function corresponding to that function code is used to generate the test case. On the other hand, if all valid function codes have been selected for bypassing, the test case generator returns an error message indicating that the test case could not be built. It should be appreciated that, in certain example embodiments, multiple valid function codes determined not to have been selected for bypassing can be used to generate the test case.

Example embodiments described herein for generating a test case using only function(s) corresponding to valid function code(s) that have not been selected for bypassing provides a number of technical effects and improvements to conventional test stream generation methodologies such as test stream generation methodologies associated with the detection of the destruction of output data of cryptographic encrypted key operations. In particular, such conventional test stream generation methodologies require code changes each time a specific set of functions are selected to generate one or more test cases. In addition, test stream generator and simulator code changes are conventionally required each time a specific set of valid functions are not selected for generating a test case. Example embodiments of the invention include technical features that eliminate the need for such code changes by providing a mechanism that ensures that only valid and non-bypassed function codes are used to generate a test case. Example embodiments further enable a test program to build and execute a test stream that includes those instructions and their functions that have experienced failure and exclude those that have not, and thus, provide a more efficient mechanism for detecting the cause of the failure. Thus, example embodiments of the invention provide an improvement to computer technology—specifically computer-based test stream generation technology—that improves the functioning of a computer.

Example embodiments also relate to, among other things, systems, methods, computer-readable media, techniques, and methodologies for generating an exception test case (e.g., a specification exception interrupt) using only one or more invalid function codes that have not been selected for bypassing. In example embodiments, an exception test case is built using an invalid function in order to cause a specification exception to occur. For instance, executing an invalid/unsupported function of a cryptographic instruction results in a specification exception program interrupt.

In accordance with example embodiments, a check is performed to determine whether a user has provided a selection of one or more function codes for bypassing. If the user has not provided such a selection, an additional check is performed to determine whether there is at least one invalid function code available for use for a given instruction. If it is determined that there is at least one invalid function code, a function code is selected at random. A determination is then made as to whether the function code is a valid function code for the given instruction. If determined to be an invalid function code, the function code is compared against a data structure that indicates which function codes have been selected for bypassing to determine if the invalid function code has been bypassed. If the function code is not selected for bypassing—which indicates that the function code is both invalid and non-bypassed—then the function code is used to generate an exception test case (e.g., a specification exception interrupt). If the function code is valid and/or has been selected for bypassing, the function code is excluded from the exception test case. In certain example embodiments, because this execution path is entered when the user has not selected any function codes for bypassing, all function codes associated with the given instruction (both valid and invalid) are set to a default non-bypassing state. Thus, in example embodiments, as long as there is at least one invalid function code, the exception test case can be generated when the at least one function code is selected as the random function code.

In accordance with example embodiments, if, on the other hand, the user has provided a selection of one or more function codes for bypassing, then the optionally format-converted data structure indicating which function codes have been bypassed (and which function codes have not been bypassed) is scanned to attempt to locate a function code that has not been bypassed and that is not present in the data structure containing valid function codes, and thus, is invalid. If at least one non-bypassed and invalid function code is located, the process may proceed to the selection of a random function code, as described above. If no non-bypassed and invalid function code is located, then the system may disable the exception test case, or alternatively, prompt the user to make new a selection of function codes for bypassing that excludes at least one invalid function code from bypassing.

Example embodiments described herein for generating an exception test case using only function(s) corresponding to invalid function code(s) that have not been selected for bypassing provides a number of technical effects and improvements to conventional exception test stream generation methodologies. In particular, during new machine bring-up testing, it is common for a machine to erroneously report a valid function as an invalid function. In such an example scenario, an exception test case built with the function (which is reported as invalid) would not work properly. In particular, the test case is expected to cause a specification exception because the function is believed to be invalid. However, because the function is erroneously reported as invalid and is actually a valid function, the test case would execute without causing the exception. In addition, this same scenario arises in connection with conventional test stream generation methodologies that employ code changes to reduce the number of valid functions to a smaller set of functions that have seen failure. By doing so, the valid functions removed via the code changes would now appear as invalid to a test program, and as such, could be used to generate an exception test case. But, as similarly described earlier, an exception test case generated using such functions would not operate as expected (i.e., would not return an exception) because such functions are in fact valid.

Example embodiments eliminate this drawback associated with conventional exception test stream generation by including technical features that provide the capability for a user to select functions to be bypassed and the capability to compare those selected bypassed functions to functions identified as valid or invalid to identify invalid, non-bypassed functions to include in an exception test case. These technical features can be leveraged to exclude, for example, functions known to be erroneously reported as invalid or functions that have not seen failure from an exception test case by selecting such functions for bypassing. Thus, example embodiments of the invention provide an additional improvement to computer technology—specifically computer-based exception test stream generation technology— that further improves the functioning of a computer.

Various illustrative methods and corresponding data structures associated therewith will now be described. It should be noted that any given operation of the method 300 and/or the method 400 may be performed by one or more of the program modules or the like depicted in FIG. 1, 2, or 5, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 3:
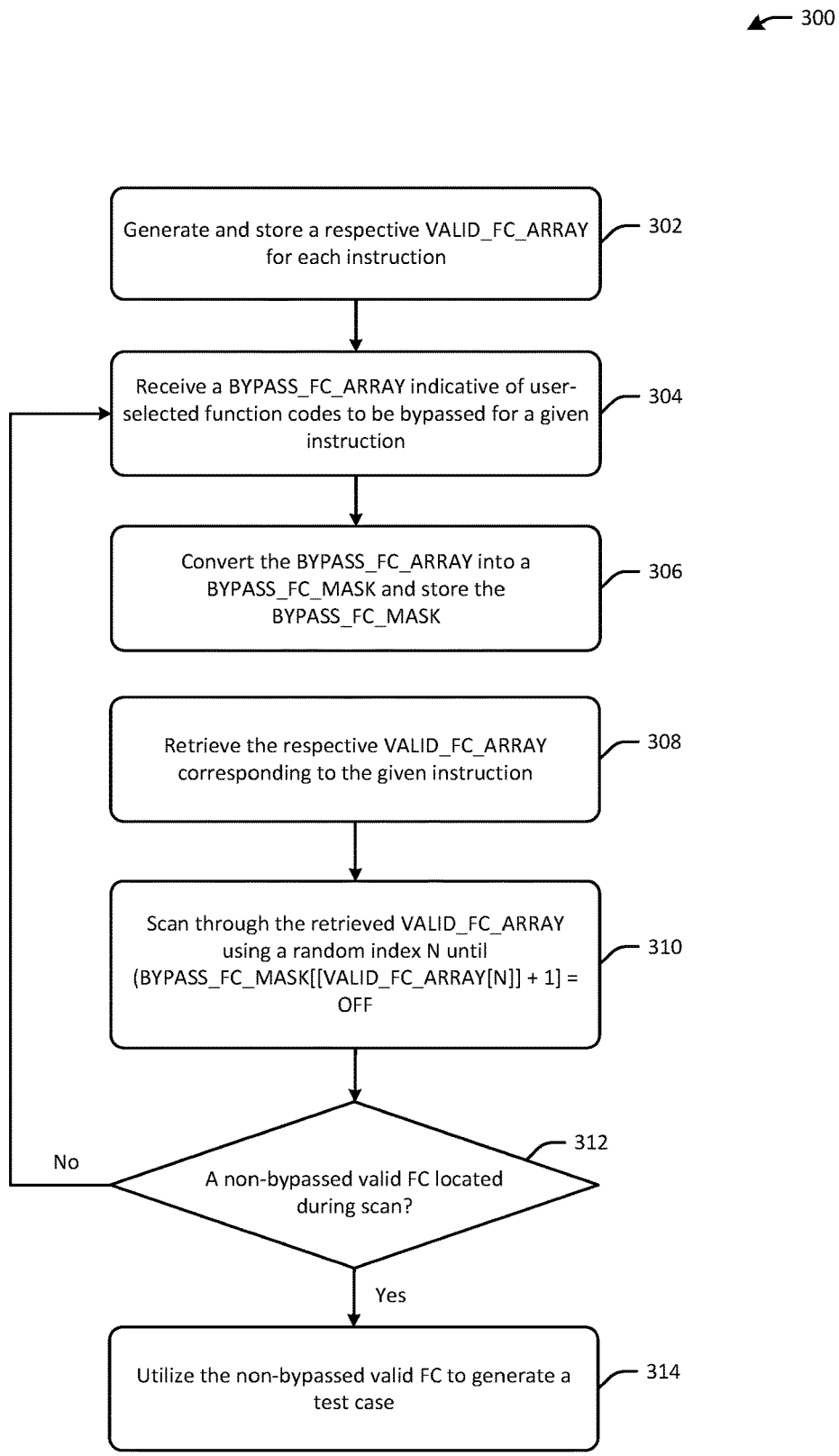
FIG. 3 is a process flow diagram of an illustrative method for generating a test case using a valid and non-bypassed function in accordance with one or more example embodiments.

FIG. 1 is a schematic hybrid data flow/block diagram illustrating test case generation using a valid and non-bypassed function in accordance with example embodiments. FIG. 3 is a process flow diagram of an illustrative method 300 for generating a test case using a valid and non-bypassed function in accordance with one or more example embodiments. FIGS. 1 and 3 will be described in conjunction with one another hereinafter.

In accordance with example embodiments, at block 302 of the method 300, a test stream generator 108 generates and stores, for each instruction supported by a machine, a respective data structure that indicates which function codes are valid for the instruction. In example embodiments, each respective data structure may take the form of an array (VALID_FC_ARRAY) that includes a valid function code at each index of the array. The set of instructions 116 supported by a machine and the arrays 118 (VALID_FC_ARRAYs) containing the corresponding valid function codes may be stored in one or more datastores 114. While example embodiments may be generally described herein in connection with an array containing only the valid function codes for an instruction, it should be appreciated that any suitable data structure may be employed. For instance, in alternative example embodiments, a data structure may be employed that represents all function codes—valid and invalid. For example, a respective bit mask may be generated for each instruction, where bits at bit positions corresponding to valid function codes for that instruction are set to a binary one and bits at bit positions corresponding to invalid function codes for that instruction are set to a binary zero.

At block 304 of the method 300, a test program 106 receives user input from a user 102. The user input may take the form of an array (e.g., BYPASS_FC_ARRAY 104) that includes, at each index of the array 104, a respective function code the user 102 has selected for bypassing. Upon receipt of the BYPASS_FC_ARRAY 104, the test program 106 passes the array 104 to the test stream generator 108. In example embodiments, at block 306 of the method 300, the test stream generator 108 optionally converts the BYPASS_FC_ARRAY 104 into a bit mask (e.g., BYPASS_FC_MASK 110) and provides the bit mask as input to a test case generator 112. It should be appreciated that, in example embodiments, BYPASS_FC_ARRAY 104 and the corresponding BYPASS_FC_MASK 110 are specific to a particular instruction. That is, a unique BYPASS_FC_ARRAY is specified for each instruction and a corresponding unique BYPASS_FC_MASK is generated for each instruction, in example embodiments. For example, a KMA_BYPASS_FC_MASK may be generated for a KMA instruction.

BYPASS_FC_MASK 110 is a bit mask of all possible function codes (valid and invalid), where each bit position in the bit mask corresponds to a respective function code. In example embodiments, the bit position (i.e., the index number of a bit) is equivalent to the corresponding function code. For instance, in example embodiments, function code zero is the lowest function code and corresponds to the first bit (i.e., the zero bit) in BYPASS_FC_MASK 110. Similarly, function code 1 corresponds to the second bit, function code 2 corresponds to the third bit, and so forth. As part of the optional conversion performed at block 306, a respective bit at each bit position corresponding to a function code selected for bypassing by the user 102 (e.g., a function code specified in BYPASS_FC_ARRAY 104) is set to indicate that the corresponding function code is to be bypassed. Setting a bit may refer to assigning a binary one to the bit. Thus, in example embodiments, each bit in BYPASS_FC_MASK 110 that is located at a bit position corresponding to a function code that has been selected for bypassing is set to a binary one and each bit that is located at a bit position that does not correspond to function code that has been selected for bypassing has a binary zero value.

As a non-limiting example, if BYPASS_FC_ARRAY 104 includes function codes 0, 4, 7, and 9, then the bits at bit positions 1, 5, 8, and 10 in BYPASS_FC_MASK 110 would be set to a binary one and all other bits in BYPASS_FC_MASK 110 would remain a binary zero. The bits at bit positions 1, 5, 8, and 10 would be set because these bit positions correspond to index numbers 0, 4, 7, and 9, which in turn, are equivalent to the function codes selected for bypassing in BYPASS_FC_ARRAY 104.

In certain alternative example embodiments, a binary zero is used in BYPASS_FC_MASK 110 to indicate those function codes that are not to be bypassed and a binary one is used to indicate those function codes that have been selected for bypassing. Further, in certain alternative example embodiments, the user 102 indicates the function codes selected for bypassing in BYPASS_FC_MASK 110 itself. For instance, according to such alternative example embodiments, rather than receiving user input in the form of an array (e.g., BYPASS_FC_ARRAY 104) that only includes the function codes to be bypassed, a bit mask representing all valid and invalid function codes in which all bits have an initial binary zero value is provided to the user 102, and the user 102 sets those bits at bit positions corresponding to the function codes the user wishes to bypass in connection with test case generation for a given instruction. In this manner, the user 102 directly specifies BYPASS_FC_MASK 110.

In certain example embodiments, a function code is 8 bits in length and BYPASS_FC_MASK 110 is 256 bits in length to accommodate each possible function code at a particular corresponding bit position in the bit mask. It should be appreciated, however, that function codes can have any bit length and BYPASS_FC_MASK 110 can be any suitable size. In certain example embodiments, one or more function codes are associated with both encryption and decryption operations, where each such function code contains two portions—a first portion associated with an encryption operation and a second portion associated with a corresponding decryption operation. Such example function codes are referred to herein as composite function codes. For instance, in example embodiments, a composite function code is 16 bits in length, with the first 8 bits of the composite function code (a first portion) representing a function code to be used for the encryption operation and the second 8 bits (a second portion) representing a function code to be used for the decryption operation. In example embodiments, the seven less significant bits of each of the first portion and the second portion of a composite function code are the same, and the most significant bit of each portion indicates whether the portion represents a function code associated with an encryption operation or the corresponding decryption operation. For instance, a binary zero in the most significant bit may indicate an association with an encryption operation and a binary one in the most significant bit may indicate an associated with a decryption operation.

In example embodiments, a composite function code is represented by two bit positions in BYPASS_FC_MASK 110, one bit position that corresponds to the first portion of the composite function code (the encryption function code) and another bit position that corresponds to the second portion of the composite function code (the decryption function code). For instance, if the encryption function code (i.e., the first portion of a composite function code) has binary zero values for all 8 bits, then the encryption function code would be designated as function code zero. As such, bit 1 in BYPASS_FC_MASK 110 having an index number of zero would represent the encryption function code designated as function code zero. In this non-limiting example, the seven less significant bits of the decryption function code (i.e., the second portion of the composite function code) would all be binary zero values, but the most significant bit of the decryption function code would have a binary one value. As such, the decryption function code would be designated as function code 128, and bit 129 in BYPASS_FC_MASK 110 having an index number of 128 would represent the decryption function code designated as function code 128. More generally, in accordance with example embodiments, if function code N is associated with an encryption operation that has a corresponding decryption operation, then function code N+128 would be associated with the decryption operation, and bits N+1 and (N+128+1), which are located at bit positions N and N+128, respectively, would represent the function codes N and N+128, respectively.

Referring again to FIG. 3 in conjunction with FIG. 1, at block 308 of the method 300, the test case generator 112 retrieves the respective stored VALID_FC_ARRAY 122 corresponding to an instruction 120 for which a test case is being generated. As described earlier, the retrieved VALID_FC_ARRAY 122 includes valid function codes for the instruction 120. Then, at block 310 of the method 300, the test case generator 112 scans the retrieved VALID_FC_ARRAY 122 using a random index N until BYPASS_FC_MASK 110[VALID_FC_ARRAY 122[N]]+1]=OFF. More specifically, the test case generator 112 selects an index N of VALID_FC_ARRAY 122 at random and scans through VALID_FC_ARRAY 122 beginning at the selected index to identify a valid function code in VALID_FC_ARRAY 122 that is not selected for bypassing in BYPASS_FC_MASK 110. In particular, in example embodiments, the test case generator 112 identifies the valid function code at index N in VALID_FC_ARRAY 122 and determines whether a corresponding bit in BYPASS_FC_MASK 110 has been set (e.g., whether the corresponding bit is ON). If the corresponding bit has not been set (e.g., the bit is OFF), the test case generator iterates to the next index N+1, identifies the valid function code at index N+1 in VALID_FC_ARRAY 122, and determines whether a bit in BYPASS_FC_MASK 110 corresponding to the valid function code at index N+1 has been set.

In example embodiments, the test case generator 112 iterates through VALID_FC_ARRAY 122 until a valid function code is identified whose corresponding bit in the BYPASS_FC_MASK 110 is OFF, indicating that the function code has not been selected for bypassing. This corresponds to a positive determination at block 312 of the method 300. In response to a positive determination at block 312, the test case generator 112 utilizes the identified valid and non-bypassed function code to generate a test case 124. More specifically, the test case generator 112 includes a function corresponding to the valid and non-bypassed function code in the generated test case 124. On the other hand, if after scanning the entire VALID_FC_ARRAY 122, every function code that is encountered is determined to have been selected for bypassing (e.g., the respective corresponding bit in BYPASS_FC_MASK 110 for each function code in VALID_FC_ARRAY 122 has been set to ON), then a negative determination is made at block 312, and the method 300 returns to block 304 to receive new bypass selection input from the user 102 (e.g., a new BYPASS_FC_ARRAY 104). Optionally, the test case generator 112 also generates and presents an error message to the user 102 indicating that the test case 124 could not be generated.

In certain example embodiments, the test case generator 112 iterates through the entire VALID_FC_ARRAY 122 regardless of whether a valid and non-bypassed function code is identified. That is, in certain example embodiments, the test case generator 112 scans the entire VALID_FC_ARRAY 122 to identify all valid and non-bypassed function codes that can be used to generate the test case 124. In other alternative example embodiments, the test case generator 112 halts the scan upon identifying a valid and non-bypassed function code. In example embodiments, the test case generator 112 performs a circular scan of VALID_FC_ARRAY 122, beginning at the randomly selected index, continuing to the last index of VALID_FC_ARRAY 122, wrapping around to the first index of VALID_FC_ARRAY 122, and continuing until the initial randomly selected index is reached again.

Figure 2:
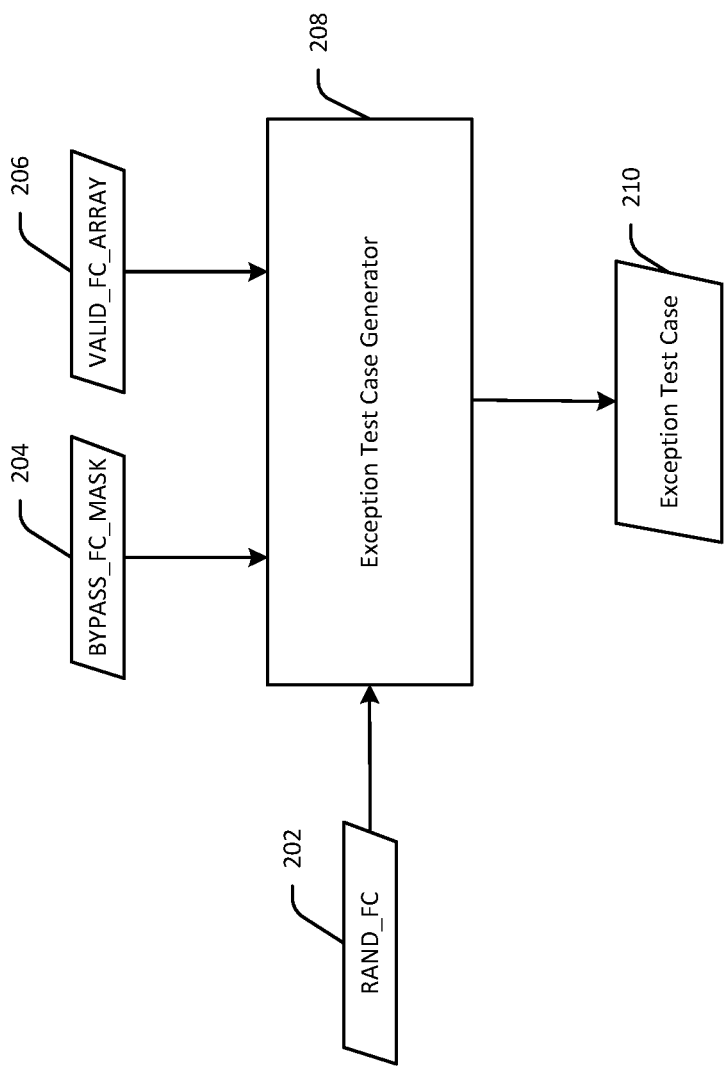
FIG. 2 is a schematic hybrid data flow/block diagram illustrating the generation of an exception test case using a non-bypassed invalid function in accordance with example embodiments.
Figure 4:
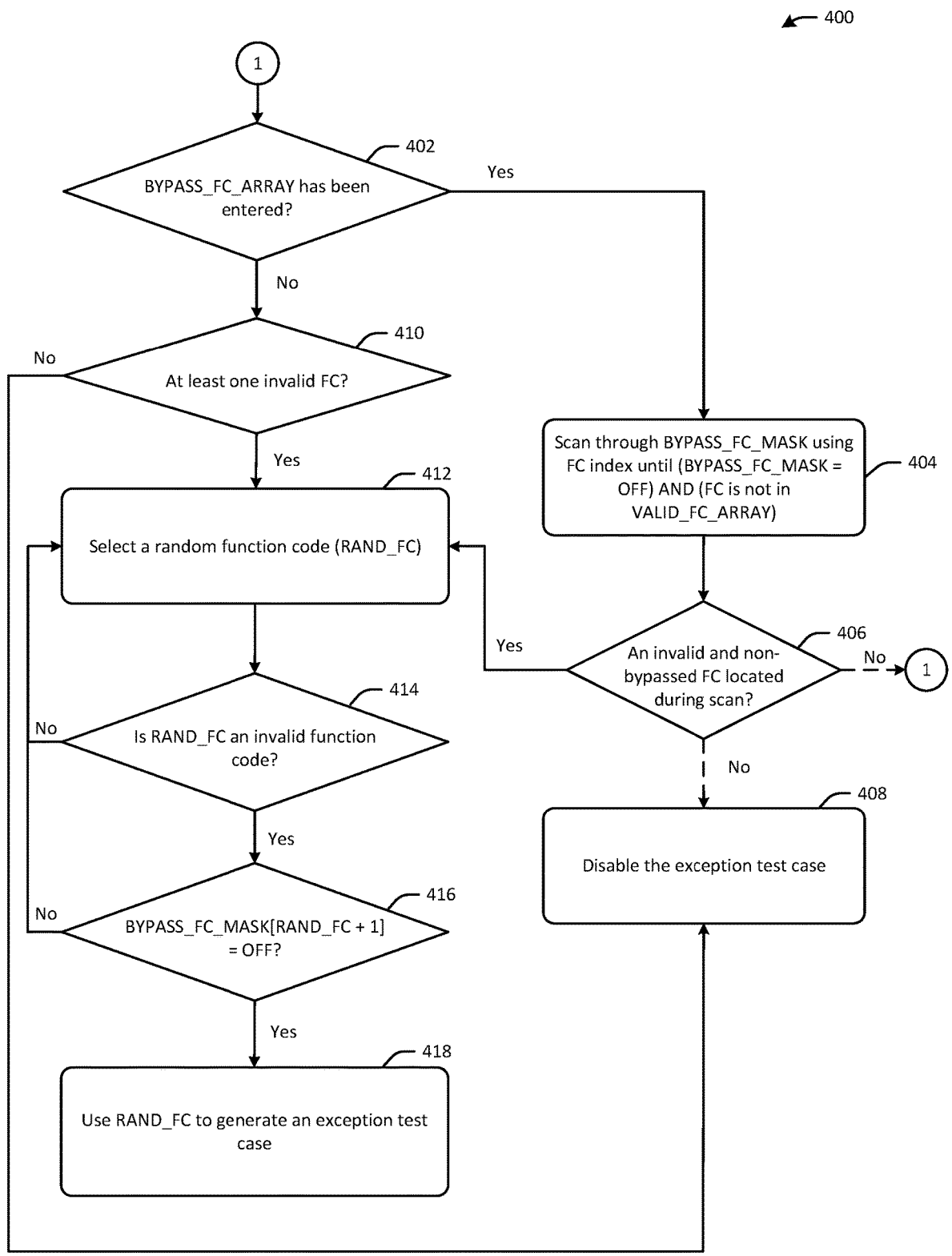
FIG. 4 is a process flow diagram of an illustrative method for generating an exception test case using an invalid and non-bypassed function in accordance with one or more example embodiments.

FIG. 2 is a schematic hybrid data flow/block diagram illustrating the generation of an exception test case using a non-bypassed invalid function in accordance with example embodiments. FIG. 4 is a process flow diagram of an illustrative method 400 for generating an exception test case using an invalid and non-bypassed function in accordance with one or more example embodiments. FIGS. 2 and 4 will be described in conjunction with one another and, at times, with FIG. 1 hereinafter.

At block 402 of the method 400, the exception test case generator 208 determines whether the user 102 has selected any function code(s) by bypassing (e.g., whether the user 102 has provided BYPASS_FC_ARRAY 104 as input). In response to a positive determination at block 402 indicating that the user 102 has provided the BYPASS_FC_ARRAY 104, the method 400 proceeds to block 404, where the exception test generator 208 scans through a BYPASS_FC_MASK 204 (which may be BYPASS_FC_MASK 110 generated from BYPASS_FC_ARRAY 104) using the function code index to attempt to locate a non-bypassed function code (BYPASS_FC_MASK=OFF) that is also invalid (not present in VALID_FC_ARRAY 206).

At block 406 of the method 400, the exception test case generator 208 determines whether an invalid and non-bypassed function code was located during the scan performed at block 404. If an invalid and non-bypassed function code is located (a positive determination at block 406), the method 400 proceeds to block 412 for selection of a random function code. On the other hand, if no invalid and non-bypassed function code is located during the scan performed at block 404, a negative determination is made at block 406, and the method 400 may proceed either to block 408, where the exception test case generator 208 disables the exception test case 210, or to block 402, where the user 102 is prompted to provide a selection of one or more function codes for bypassing (e.g., provide a new BYPASS_FC_ARRAY).

Referring again to block 402, if the user has not provided a BYPASS_FC_ARRAY, a negative determination is made at block 402, and the method 400 proceeds to block 410, where the exception test case generator 208 determines whether there is at least one invalid function code for the given instruction. In response to a negative determination at block 410, the method 400 proceeds to block 408, where the exception test case generator 208 disables the exception test case 210 because no invalid function codes are available for generating the exception test case 210. On the other hand, in response to a positive determination at block 410, the method 400 proceeds to block 412, where a random function code RAND_FC 202 is selected. In certain example embodiments, the random function code RAND_FC 202 is selected by the user 102. In other example embodiments, the exception test generator 208 is configured to select RAND_FC 202. RAND_FC 202 can be a valid function code or an invalid function code.

Then, at block 414 of the method 400, the exception test case generator 208 determines whether RAND_FC 202 is an invalid function code. In particular, the exception test case generator 208 scans the VALID_FC_ARRAY 206 (e.g., VALID_FC_ARRAY 122) to determine whether RAND_FC 202 is present in VALID_FC_ARRAY 206. If RAND_FC 202 is located in VALID_FC_ARRAY 206 indicating that RAND_FC 202 is a valid function code, a negative determination is made at block 414, and the method 400 returns to block 412 for selection of a new random function code. On the other hand, if RAND_FC 202 is not located in VALID_FC_ARRAY 206, this indicates that RAND_FC 202 is an invalid function code, and a positive determination is made at block 414.

After a positive determination at block 414, the exception test case generator 208 determines, at block 416 of the method 400, whether a bit in the BYPASS_FC_MASK 204 (e.g., BYPASS_FC_MASK 110) that corresponds to RAND_FC 202 has been set to indicate that RAND_FC 202 should be bypassed. That is, the exception test case generator 208 determines at block 416 whether BYPASS_FC_MASK 206[RAND_FC 202+1]=OFF. More specifically, at block 416, the exception test case generator locates the RAND_FC+1 bit in BYPASS_FC_MASK 206 which has an index of RAND_FC, and thus, corresponds to RAND_FC 202, and determines whether the RAND_FC+1 bit has been set to indicate that the corresponding function code RAND_FC 202 should be bypassed. In response to a positive determination at block 416 indicating that the RAND_FC+1 bit in BYPASS_FC_MASK 206 has not been set (e.g., has a binary value associated with an OFF state), then the exception test case generator 208 uses the selected invalid function code (RAND_FC 202) to generate the exception test case 210, which would generate, for example, a specification exception interrupt 210 when executed by the machine. On the other hand, in response to a negative determination at block 416 indicating that the RAND_FC+1 bit in BYPASS_FC_MASK 206 has been set to bypass (e.g., has a binary value associated with an ON state), the method 400 may return to block 412 for selection of a new random function code.

Thus, the illustrative method 400 includes technical features that allow for generation of an exception test case 210 (e.g., a specification exception interrupt) using only invalid and non-bypassed function codes. In accordance with example embodiments, the user 102 can ensure that the exception test case 210 that is generated operates as expected (i.e., results in an exception) by selecting for bypass any valid function code that has been erroneously reported as being invalid as well as any valid function code that is not experiencing failure and that would otherwise be interpreted as being invalid by conventional exception test case generation processes that require code changes to reduce the number of valid functions to a smaller set of functions that have seen failure.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 5:
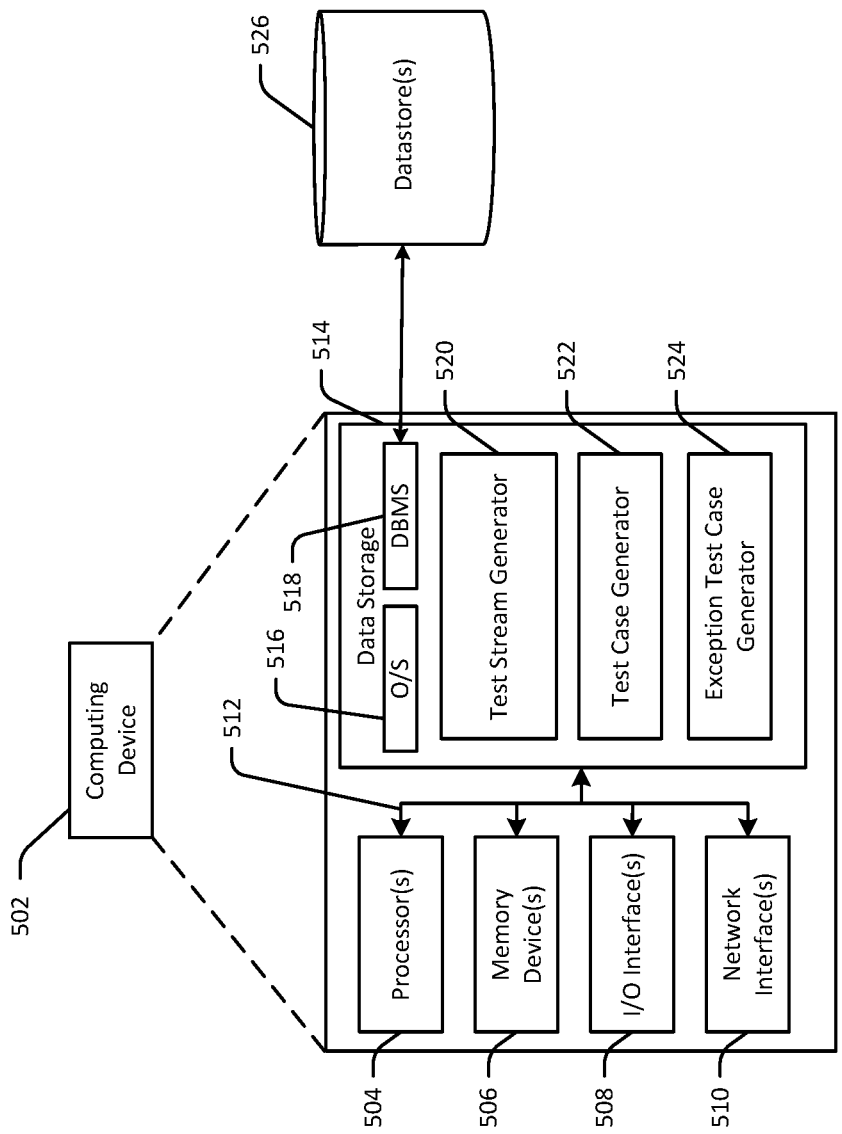
FIG. 5 is a schematic diagram of an illustrative computing device configured to implement one or more example embodiments.

FIG. 5 is a schematic diagram of an illustrative computing device 502 configured to implement one or more example embodiments of the disclosure. The computing device 502 may be any suitable device including, without limitation, a server, a personal computer (PC), a tablet, a smartphone, a wearable device, a voice-enabled device, or the like. While any particular component of the computing device 502 may be described herein in the singular, it should be appreciated that multiple instances of any such component may be provided, and functionality described in connection with a particular component may be distributed across multiple ones of such a component.

Although not depicted in FIG. 5, the computing device 502 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 may include one or more processors (processor(s)) 504, one or more memory devices 506 (generically referred to herein as memory 506), one or more input/output ("I/O") interface(s) 508, one or more network interfaces 510, and data storage 514. The computing device 502 may further include one or more buses 512 that functionally couple various components of the computing device 502.

The bus(es) 512 may include at least one of a system bus, a memory bus, an address bus, or a message bus, and may permit the exchange of information (e.g., data (including computer-executable code), signaling, etc.) between various components of the computing device 502. The bus(es) 512 may include, without limitation, a memory bus or a memory controller, a peripheral bus, an accelerated graphics port, and so forth. The bus(es) 512 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 506 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 506 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 506 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 506 and the data storage 514, removable and/or non-removable, are examples of computer-readable storage media (CRSM) as that term is used herein.

The data storage 514 may store computer-executable code, instructions, or the like that may be loadable into the memory 506 and executable by the processor(s) 504 to cause the processor(s) 504 to perform or initiate various operations. The data storage 514 may additionally store data that may be copied to memory 506 for use by the processor(s) 504 during the execution of the computer-executable instructions. Moreover, output data generated as a result of execution of the computer-executable instructions by the processor(s) 504 may be stored initially in memory 506 and may ultimately be copied to data storage 514 for non-volatile storage.

More specifically, the data storage 514 may store one or more operating systems (O/S) 516; one or more database management systems (DBMS) 518 configured to access the memory 506 and/or one or more external datastores 526; and one or more program modules, applications, engines, managers, computer-executable code, scripts, or the like such as, for example, a test stream generator 520, a test case generator 522, and an exception test case generator 524. Any of the components depicted as being stored in data storage 514 may include any combination of software, firmware, and/or hardware. The software and/or firmware may include computer-executable instructions (e.g., computer-executable program code) that may be loaded into the memory 506 for execution by one or more of the processor(s) 504 to perform any of the operations described earlier in connection with correspondingly named modules.

Although not depicted in FIG. 5, the data storage 514 may further store various types of data utilized by components of the computing device 502 (e.g., data stored in the datastore(s) 526). Any data stored in the data storage 514 may be loaded into the memory 506 for use by the processor(s) 504 in executing computer-executable instructions. In addition, any data stored in the data storage 514 may potentially be stored in the external datastore(s) 526 and may be accessed via the DBMS 518 and loaded in the memory 506 for use by the processor(s) 504 in executing computer-executable instructions.

The processor(s) 504 may be configured to access the memory 506 and execute computer-executable instructions loaded therein. For example, the processor(s) 504 may be configured to execute computer-executable instructions of the various program modules, applications, engines, managers, or the like of the computing device 502 to cause or facilitate various operations to be performed in accordance with one or more embodiments of the disclosure. The processor(s) 504 may include any suitable processing unit capable of accepting data as input, processing the input data in accordance with stored computer-executable instructions, and generating output data. The processor(s) 504 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 504 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 504 may be capable of supporting any of a variety of instruction sets.

Referring now to other illustrative components depicted as being stored in the data storage 514, the O/S 516 may be loaded from the data storage 514 into the memory 506 and may provide an interface between other application software executing on the computing device 502 and hardware resources of the computing device 502. More specifically, the O/S 516 may include a set of computer-executable instructions for managing hardware resources of the computing device 502 and for providing common services to other application programs. In certain example embodiments, the O/S 516 may include or otherwise control the execution of one or more of the program modules, engines, managers, or the like depicted as being stored in the data storage 514. The O/S 516 may include any operating system now known or which may be developed in the future including, but not limited to, any server operating system, any mainframe operating system, or any other proprietary or non-proprietary operating system.

The DBMS 518 may be loaded into the memory 506 and may support functionality for accessing, retrieving, storing, and/or manipulating data stored in the memory 506, data stored in the data storage 514, and/or data stored in external datastore(s) 526. The DBMS 518 may use any of a variety of database models (e.g., relational model, object model, etc.) and may support any of a variety of query languages. The DBMS 518 may access data represented in one or more data schemas and stored in any suitable data repository. The datastore(s) 526 may include datastore(s) 114. As such, data stored in the datastore(s) 526 may include, for example, the instructions 116, VALID_FC_ARRAYs 118 corresponding to the instructions 116, BYPASS_FC_ARRAYs, BYPASS_FC_MASKs, test cases, exception test cases, and so forth. External datastore(s) 526 that may be accessible by the computing device 502 via the DBMS 518 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 502, the input/output (I/O) interface(s) 508 may facilitate the receipt of input information by the computing device 502 from one or more I/O devices as well as the output of information from the computing device 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 502 or may be separate. The I/O devices may further include, for example, any number of peripheral devices such as data storage devices, printing devices, and so forth.

The I/O interface(s) 508 may also include an interface for an external peripheral device connection such as universal serial bus (USB), FireWire, Thunderbolt, Ethernet port or other connection protocol that may connect to one or more networks. The I/O interface(s) 508 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 may further include one or more network interfaces 510 via which the computing device 502 may communicate with any of a variety of other systems, platforms, networks, devices, and so forth. The network interface(s) 510 may enable communication, for example, with one or more other devices via one or more of the network(s).

It should be appreciated that the program modules/engines depicted in FIG. 5 as being stored in the data storage 514 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 502 and/or other computing devices accessible via one or more networks, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the computing device 502 may include alternate and/or additional hardware, software, or firmware components beyond those described or depicted without departing from the scope of the disclosure. More particularly, it should be appreciated that software, firmware, or hardware components depicted as forming part of the computing device 502 are merely illustrative and that some components may not be present or additional components may be provided in various embodiments. While various illustrative modules have been depicted and described as software modules stored in data storage 514, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 200-400 may be performed by a computing device 502 having the illustrative configuration depicted in FIG. 5, or more specifically, by one or more program modules, engines, applications, or the like executable on such a device. It should be appreciated, however, that such operations may be implemented in connection with numerous other device configurations.

The operations described and depicted in the illustrative methods of FIGS. 2-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating a test case, the computer-implemented method comprising:
    identifying a bypass function code mask indicating a group of one or more function codes selected by a user for bypassing in connection with generating the test case;
    comparing the bypass function code mask to a valid function code array indicating a group of valid function codes available for use for an instruction;
    identifying, based at least in part on the comparing, a function code in the group of valid function codes that is not indicated as being selected for bypassing in the bypass function code mask; and
    generating the test case at least in part by using a function corresponding to the function code.

2. The computer-implemented method of claim 1, further comprising:
    receiving, from the user, a bypass function code array indicating the group of one or more function codes selected for bypassing; and
    converting the bypass function code array into the bypass function code mask, wherein the converting comprises:
        determining that the function code includes a first portion for use in connection with an encryption instruction and a second portion for use in connection with a decryption instruction; and
        assigning a first bit in the bypass function code mask to the first portion of the function code and a second bit in the bypass function code mask to the second portion of the function code,
        wherein the first bit and the second bit are offset in the bypass function code mask by a predetermined number of bits.

3. The computer-implemented method of claim 1, wherein the function code is a first function code and the function corresponding to the first function code is a first function, the computer-implemented method further comprising:
    identifying, based at least in part on the comparing, a second function code in the group of valid function codes that is indicated as being selected for bypassing in the bypass function code mask; and
    excluding a second function corresponding to the second function code from the test case.

4. The computer-implemented method of claim 1, further comprising:
    selecting an instruction for generating the test case;
    generating the valid function code array for the instruction;
    receiving, from the user, an indication of the one or more function codes selected for bypassing; and
    setting one or more bits in the bypass function code mask to indicate that the group of one or more function codes are to be bypassed.

5. The computer-implemented method of claim 1, wherein comparing the bypass function code mask to the valid function code array comprises:
    randomly selecting an index of the valid function code array;
    scanning, beginning at the selected index, the valid function code array until the function code is reached;
    determining a bit position in the bypass function code mask that corresponds to the function code; and
    determining that a bit at the bit position is not set to indicate that the function code is to be bypassed.

6. The computer-implemented method of claim 1, wherein the function code is a first function code and the function corresponding to the first function code is a first function, the computer-implemented method further comprising:
    randomly selecting a second function code;
    determining that the second function code is not in the valid function code array;
    determining that the second function code is not among the group of one or more function codes selected for bypassing; and
    generating a specification exception interrupt at least in part by using a second function corresponding to the second function code.

7. The computer-implemented method of claim 6, the computer-implemented method further comprising:
    randomly selecting a third function code;
    determining one or both of: that the third function code is in the valid function code array or that the third function code is among the group of one or more function codes selected for bypassing; and
    excluding a third function corresponding to the third function code from the specification exception interrupt.

8. A system for generating a test case, the system comprising:
    at least one memory storing computer-executable instructions; and
    at least one processor of a sending device, wherein the at least one processor is configured to access the at least one memory and execute the computer-executable instructions to:

identify a bypass function code mask indicating a group of one or more function codes selected by a user for bypassing in connection with generating the test case;

compare the bypass function code mask to a valid function code array indicating a group of valid function codes available for use for an instruction;

identify, based at least in part on the comparing, a function code in the group of valid function codes that is not indicated as being selected for bypassing in the bypass function code mask; and generate the test case at least in part by using a function corresponding to the function code.

9. The system of claim 8, wherein the at least one processor is further configured to execute the computer-executable instructions to:

receive, from the user, a bypass function code array indicating the group of one or more function codes selected for bypassing; and convert the bypass function code array into the bypass function code mask, wherein the at least one processor is configured to perform the conversion by executing the computer-executable instructions to:

determine that the function code includes a first portion for use in connection with an encryption instruction and a second portion for use in connection with a decryption instruction; and assign a first bit in the bypass function code mask to the first portion of the function code and a second bit in the bypass function code mask to the second portion of the function code, wherein the first bit and the second bit are offset in the bypass function code mask by a predetermined number of bits.

10. The system of claim 8, wherein the function code is a first function code and the function corresponding to the first function code is a first function, and wherein the at least one processor is further configured to execute the computer-executable instructions to:

identify, based at least in part on the comparing, a second function code in the group of valid function codes that is indicated as being selected for bypassing in the bypass function code mask; and exclude a second function corresponding to the second function code from the test case.

11. The system of claim 8, wherein the at least one processor is further configured to execute the computer-executable instructions to:

select an instruction for generating the test case;
generate the valid function code array for the instruction;
receive, from the user, an indication of the one or more function codes selected for bypassing; and
set one or more bits in the bypass function code mask to indicate that the group of one or more function codes are to be bypassed.

12. The system of claim 8, wherein the at least one processor is configured to compare the bypass function code mask to the valid function code array by executing the computer-executable instructions to:

randomly select an index of the valid function code array;
scan, beginning at the selected index, the valid function code array until the function code is reached;
determine a bit position in the bypass function code mask that corresponds to the function code; and
determine that a bit at the bit position is not set to indicate that the function code is to be bypassed.

13. The system of claim 8, wherein the function code is a first function code and the function corresponding to the first function code is a first function, and wherein the at least one processor is further configured to execute the computer-executable instructions to:

randomly select a second function code;
determine that the second function code is not in the valid function code array;
determine that the second function code is not among the group of one or more function codes selected for bypassing; and
generate a specification exception interrupt at least in part by using a second function corresponding to the second function code.

14. The system of claim 13, wherein the at least one processor is further configured to execute the computer-executable instructions to:

randomly select a third function code;
determine one or both of: that the third function code is in the valid function code array or that the third function code is among the group of one or more function codes selected for bypassing; and
exclude a third function corresponding to the third function code from the specification exception interrupt.

15. A computer program product for generating a test case, the computer program product comprising a non-transitory storage medium readable by a processing circuit, the storage medium storing instructions executable by the processing circuit to cause a method to be performed, the method comprising:

identifying a bypass function code mask indicating a group of one or more function codes selected by a user for bypassing in connection with generating the test case;

comparing the bypass function code mask to a valid function code array indicating a group of valid function codes available for use for an instruction;

identifying, based at least in part on the comparing, a function code in the group of valid function codes that is not indicated as being selected for bypassing in the bypass function code mask; and generating the test case at least in part by using a function corresponding to the function code.

16. The computer program product of claim 15, the method further comprising:

receiving, from the user, a bypass function code array indicating the group of one or more function codes selected for bypassing; and converting the bypass function code array into the bypass function code mask, wherein the converting comprises:

determining that the function code includes a first portion for use in connection with an encryption instruction and a second portion for use in connection with a decryption instruction; and assigning a first bit in the bypass function code mask to the first portion of the function code and a second bit in the bypass function code mask to the second portion of the function code, wherein the first bit and the second bit are offset in the bypass function code mask by a predetermined number of bits.

17. The computer program product of claim 15, wherein the function code is a first function code and the function corresponding to the first function code is a first function, the method further comprising:

identifying, based at least in part on the comparing, a second function code in the group of valid function codes that is indicated as being selected for bypassing in the bypass function code mask; and excluding a second function corresponding to the second function code from the test case.

18. The computer program product of claim 15, the method further comprising:

selecting an instruction for generating the test case;

generating the valid function code array for the instruction;

receiving, from the user, an indication of the one or more function codes selected for bypassing; and setting one or more bits in the bypass function code mask to indicate that the group of one or more function codes are to be bypassed.

19. The computer program product of claim 15, wherein comparing the bypass function code mask to the valid function code array comprises:

randomly selecting an index of the valid function code array;

scanning, beginning at the selected index, the valid function code array until the function code is reached;

determining a bit position in the bypass function code mask that corresponds to the function code; and determining that a bit at the bit position is not set to indicate that the function code is to be bypassed.

20. The computer program product of claim 15, wherein the function code is a first function code and the function corresponding to the first function code is a first function, the method further comprising:

randomly selecting a second function code;

determining that the second function code is not in the valid function code array;

determining that the second function code is not among the group of one or more function codes selected for bypassing; and generating a specification exception interrupt at least in part by using a second function corresponding to the second function code.

* * * * *